(12) United States Patent
Xu et al.

(10) Patent No.: US 12,460,766 B2
(45) Date of Patent: Nov. 4, 2025

(54) DISPLAY SCREEN MOUNTING DEVICE

(71) Applicant: XINADDA (HONG KONG) LIMITED, Hong Kong (CN)

(72) Inventors: Hao Xu, Shenzhen (CN); Yongyi Xiong, Shenzhen (CN)

(73) Assignee: XINADDA (HONG KONG) LIMITED, Hong Kong (CN)

( * ) Notice: Subject to any disclaimer, the term of this patent is extended or adjusted under 35 U.S.C. 154(b) by 5 days.

(21) Appl. No.: 18/776,164

(22) Filed: Jul. 17, 2024

(65) Prior Publication Data
US 2025/0189070 A1 Jun. 12, 2025

(30) Foreign Application Priority Data
Dec. 6, 2023 (CN) .......................... 202323327021.8

(51) Int. Cl.
*F16M 11/04* (2006.01)
*F16M 11/18* (2006.01)
*F16M 11/42* (2006.01)

(52) U.S. Cl.
CPC ........... *F16M 11/046* (2013.01); *F16M 11/18* (2013.01); *F16M 11/42* (2013.01)

(58) Field of Classification Search
CPC ....... F16M 11/046; F16M 11/18; F16M 11/42
USPC .............................................. 248/125.1, 917
See application file for complete search history.

(56) References Cited

U.S. PATENT DOCUMENTS

| | | | |
|---|---|---|---|
| 8,408,505 B2 * | 4/2013 | Ye .......................... | F16M 11/105 248/176.1 |
| 12,079,031 B2 * | 9/2024 | Jeon ...................... | F16M 11/105 |
| 12,385,595 B2 * | 8/2025 | Xu .......................... | F16M 11/42 |
| 2006/0219849 A1 * | 10/2006 | Chiu .................. | F16M 11/2021 248/917 |

* cited by examiner

*Primary Examiner* — Todd M Epps
(74) *Attorney, Agent, or Firm* — Maschoff Brennan (57) ABSTRACT

The present invention relates to the technical field of display screen stands and discloses a display screen mounting device that comprises: a stand; a connection component, wherein the connection component is slidably connected to the stand, the connection component and the stand have two slidable connection positions which are spaced apart from each other, and the connection component is configured to be connected to a display screen; an electric push rod, wherein a fixed end of the electric push rod is connected to the stand, a driving end of the electric push rod is connected to the connection component, a connection position of the driving end of the electric push rod in connection with the connection component is located between the two slidable connection positions, and the electric push rod is configured to drive the connection component to move up and down along the stand. In the present invention, by setting the electric push rod, the problem that the driving synchronism of double push rods for double lifting columns is poor in the prior art is solved; and by arranging the electric push rod between the two slidable connection positions, the problem that the force acted on the connection component is uneven is solved, thereby the problem that the driving stability of a single push rod for a single lifting column is poor in the prior art is solved.

10 Claims, 10 Drawing Sheets

DISPLAY SCREEN MOUNTING DEVICE

TECHNICAL FIELD

The present invention relates to the technical field of display screen stands, in particular relates to a display screen mounting device.

BACKGROUND

With the development of science and technology in modern society, the demand for display equipment in briefing meetings is getting higher and higher. At present, the devices that can erect display equipment mainly include wall-mounted stands, manually adjustable metal stands, and electric lifting stands. In the electric lifting stands of the prior art, the control component and the motion-transmission component are both arranged inside the lifting column, resulting in poor synchronism and high cost of double columns with double push rods, while using a single column with a single push rod would adversely affect the lifting stability of the lifting stand, resulting in poor motion-transmission reliability.

SUMMARY OF THE INVENTION

In view of this, the present invention provides a display screen mounting device, which solves the problems of poor synchronism of an electric lifting stand with double columns and double push rods and poor motion-transmission reliability of an electric lifting stand with a single column and a single push rod in the prior art.

The present invention provides a display screen mounting device that comprises: a stand; a connection component, wherein the connection component is slidably connected to the stand, the connection component and the stand have two slidable connection positions which are spaced apart from each other, and the connection component is configured to be connected to a display screen; an electric push rod, wherein a fixed end of the electric push rod is connected to the stand, a driving end of the electric push rod is connected to the connection component, a connection position of the driving end of the electric push rod in connection with the connection component is located between the two slidable connection positions, and the electric push rod is configured to drive the connection component to move up and down along the stand.

Beneficial effect: By setting the electric push rod, the problem that the driving synchronism of double push rods for double lifting columns is poor in the prior art is solved. By arranging the electric push rod between the two slidable connection positions, the problem that the force acted on the connection component is uneven is solved, thereby the problem that the driving stability of a single push rod for a single lifting column is poor in the prior art is solved.

In an optional embodiment, the stand comprises two vertical rods spaced apart from each other and a bottom rod, two ends of the bottom rod are respectively connected to bottom parts of the two vertical rods, the connection component is slidably connected to the two vertical rods at the same time to form the two slidable connection positions, and the fixed end of the electric push rod is connected to the bottom rod.

In an optional embodiment, the display screen mounting device further comprises a fixing seat, the fixing seat is detachably connected with the stand and is configured to be connected to a wall, the fixing seat has a first service state and a second service state, a distance between the stand and the wall is different in the first service state and in the second service state.

Beneficial effect: The distance between the stand and the wall can be adjusted by switching between the different service states of the fixing seat, thereby enhancing the installation flexibility of the display screen mounting device and meeting the requirements of the wall in different application scenarios.

In an optional embodiment, the fixing seat comprises a first fixing plate and a second fixing plate, the first fixing plate is connected with the second fixing plate at a predetermined angle, a length of the first fixing plate is greater than that of the second fixing plate, in the first service state, the first fixing plate is connected with the stand and the second fixing plate is connected with the wall, and in the second service state, the second fixing plate is connected with the stand and the first fixing plate is connected with the wall.

In an optional embodiment, the display screen mounting device further comprises a hanging bar and a locking member, the hanging bar is configured to be connected with the display screen, the hanging bar is provided with a clamping slot, the clamping slot is correspondingly snap-fitted with the connection component, and the locking member is configured to be simultaneously inserted into the hanging bar and the connection component so as to connect and fasten the hanging bar and the connection component together.

Beneficial effect: The stability of the connection between the hanging bar and the connection component is enhanced by setting the clamping slot to be snap-fitted with the connection component and by fastening the hanging bar and the connection component together using the locking member.

In an optional embodiment, the stand further comprises a support rod, two ends of the support rod are respectively connected with the two vertical rods to divide the area between the two vertical rods to form a lifting area and an maintenance area, and the display screen mounting device further comprises a protective cover, the protective cover is detachably connected with the stand, and the protective cover covers the maintenance area.

Beneficial effect: The maintenance and replacement of electronic components in the maintenance area are facilitated by setting the protective cover to be detachably connected to the support rod.

In an optional embodiment, a buckle and a reinforcement member are arranged on a lower side of the protective cover, the buckle is snap-fitted with the bottom rod, a bottom part of the protective cover is provided with a slot, the reinforcement member is configured to be completely inserted into the slot so as to connect and fasten the protective cover and the bottom rod together, an upper side of the protective cover is further provided with a spring and a slidable pin, the spring is sleeved on the slidable pin, the slidable pin is simultaneously inserted into the protective cover and the support rod so as to connect and fasten the protective cover and the support rod together.

Beneficial effect: By arranging a buckle and a reinforcement member at a bottom part of the protective cover, the connection between the protective cover and the bottom rod is firmer, and by arranging a spring and a slidable pin at a top part of the protective cover, the connection between the protective cover and the support rod is firmer, thereby further improving the protective performance of the protective cover for the electronic components in the maintenance area.

In an optional embodiment, the display screen mounting device further comprises a base component, the base component is detachably connected to a bottom part of the stand.

In an optional embodiment, the base component comprises a base body and a baffle plate, the base body is connected to the baffle plate, the baffle plate covers the maintenance area and is spaced apart from the protective cover.

Beneficial effect: By setting the baffle plate, undesired damage caused by exposure of cables and power supply accessories on the back side is prevented, and personal safety is guaranteed for users.

In an optional embodiment, the base body comprises a plurality of base pieces, and the plurality of base pieces can be joined together; and/or, the base component further comprises a plurality of rollers, wherein, the plurality of the rollers are arranged to correspond to the base body.

Beneficial effect: By splitting the base body into a plurality of pieces, the base can be quickly disassembled and assembled, the storage space is reduced, the packaging material and the costs are saved; and by arranging a plurality of rollers, the mobility of the display screen mounting device is improved.

BRIEF DESCRIPTION OF THE DRAWINGS

In order to explain more clearly technical solutions in specific embodiments of the present invention or in the prior art, the drawings needed to be used in the description of specific embodiments or the prior art is briefly introduced below. Apparently, the drawings described below only represent some embodiments of the present invention, and other drawings can be obtained from these drawings without any creative effort by a person skilled in the art.

REFERENCE NUMERALS

1. stand; 101. vertical rod; 102. bottom rod; 103. support rod; 2. connection component; 3. electric push rod; 4. fixing seat; 401. first fixing plate; 4011. first hole; 402. second fixing plate; 4021. second hole; 5. hanging bar; 6. locking member; 7. protective cover; 8. base component; 801. base body; 8011. base piece; 802. baffle plate; 803. roller; 9. wired manual controller; 10. protective coil; 11. adjustable foot; 12. wire pressing plate; 13. circular socket; 14. control box; 15. control box connector; 16. adapter; 17. adapter connector; 18. lifting area; 19. maintenance area; 20. spring; 21. slidable pin; 22. buckle; 23. reinforcement member.

DETAILED DESCRIPTION

In order to make the purposes, technical schemes and advantages of the embodiments of the present invention more clearly understood, the technical schemes of the embodiments of the present invention will be clearly and completely described in conjunction with the accompanying drawings of the embodiments of the present invention. Apparently, the described embodiments only represent part of the embodiments of the present invention, but not all of the embodiments. Based on the embodiments described in the present invention, all other embodiments obtainable without creative efforts by those skilled in the art fall within the scope of protection of the present invention.

Embodiments of the present invention will be described below in conjunction with FIGS. 1 to 8.

Figure 1:
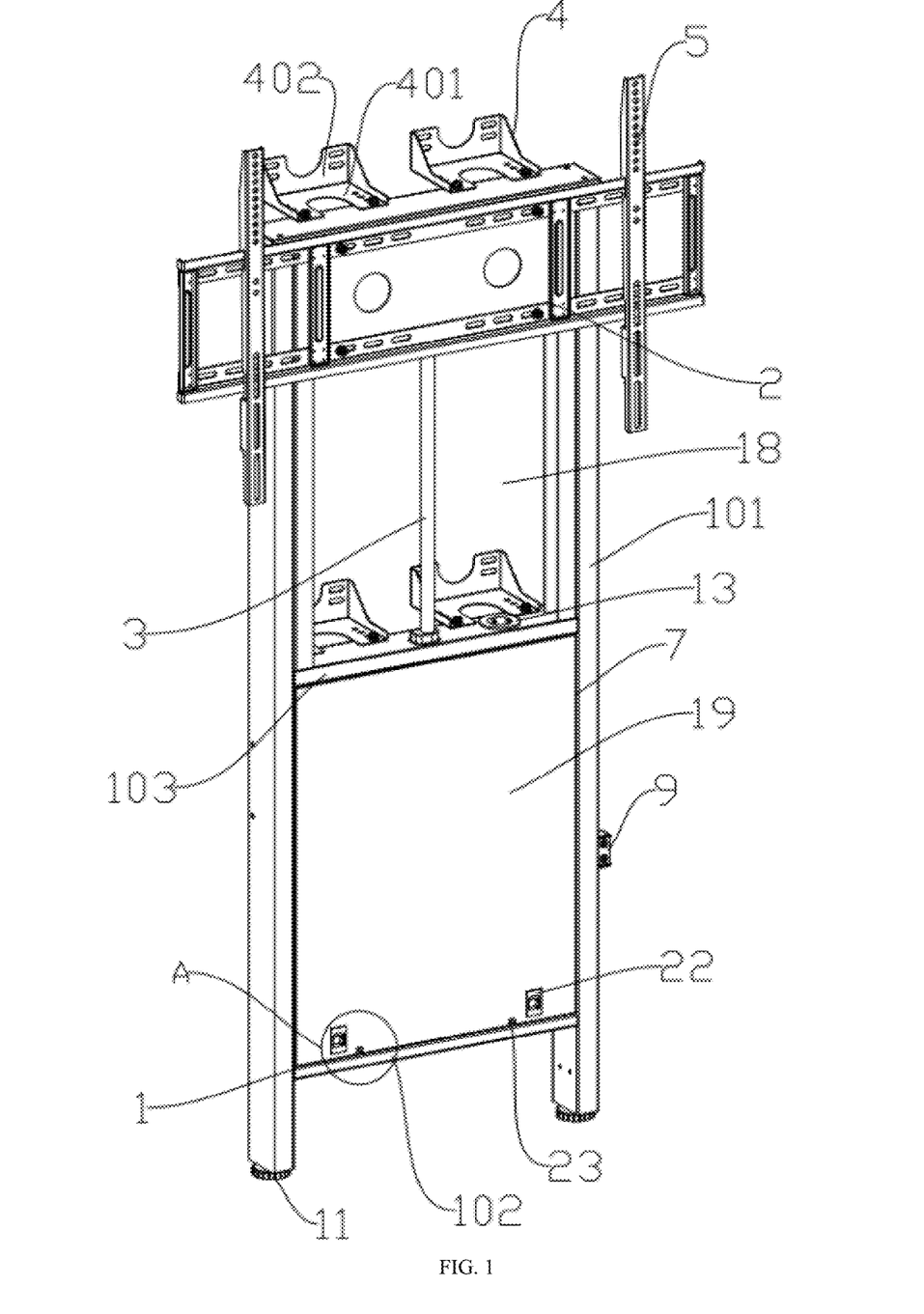
FIG. 1 is a schematic diagram of the front-side structure of the display screen mounting device according to an embodiment of the present invention.

According to the embodiments of the present invention, as shown in FIG. 1, a display screen mounting device is provided and comprises a stand 1, a connection component 2 and an electric push rod 3. The connection component 2 is slidably connected to the stand 1, the connection component 2 and the stand 1 have two slidable connection positions spaced apart from each other, and the connection component 2 is configured to be connected to a display screen. A fixed end of the electric push rod 3 is connected to the stand 1, a driving end of the electric push rod 3 is connected to the connection component 2, a connection position of the driving end of the electric push rod 3 in connection with the connection component 2 is located between the two slidable connection positions, and the electric push rod 3 is configured to drive the connection component 2 to move up and down along the stand 1.

By providing the electric push rod 3, the problem that the synchronism of double push rods is poor is solved, furthermore, by arranging the electric push rod 3 between the two slidable connection positions, the problem of uneven force being acted on the connection component 2 is solved, thereby solving the problem of poor stability.

Specifically, the fixed end of the electric push rod 3 is connected to the stand 1 by the cooperation of a round-headed inner-hexagonal screw bolt of M10 mm*45 mm (with a thread length of 15 mm) and an M10 mm antiskid screw nut, and the driving end of the electric push rod 3 is connected to the connection component 2 by the cooperation of a round-headed inner-hexagonal screw bolt of M10 mm*50 mm (with a thread length of 15 mm) and an M10 mm antiskid screw nut.

It is worth noting that the connection component 2 has a front side and a back side that are distinguished from each other, and the connection position between the electric push rod 3 and the connection component 2 is located on the back side of the connection component 2, that is, on the side close to the wall.

In an embodiment, as shown in FIG. 1, the stand 1 comprises two vertical rods 101 spaced apart from each other and a bottom rod 102, two ends of the bottom rod 102 are respectively connected to bottom parts of the two vertical rods 101, the connection component 2 is slidably connected to the two vertical rods 101 at the same time to form the two slidable connection positions, and the fixed end of the electric push rod 3 is connected to the bottom rod 102.

Specifically, in this embodiment, the two vertical rods 101 are both provided with sliders, the two ends of the connection component 2 are both provided with sliding blocks, and the electric push rod 3 drives the sliding blocks of the connection component 2 to move up and down in the sliders.

Figure 2:
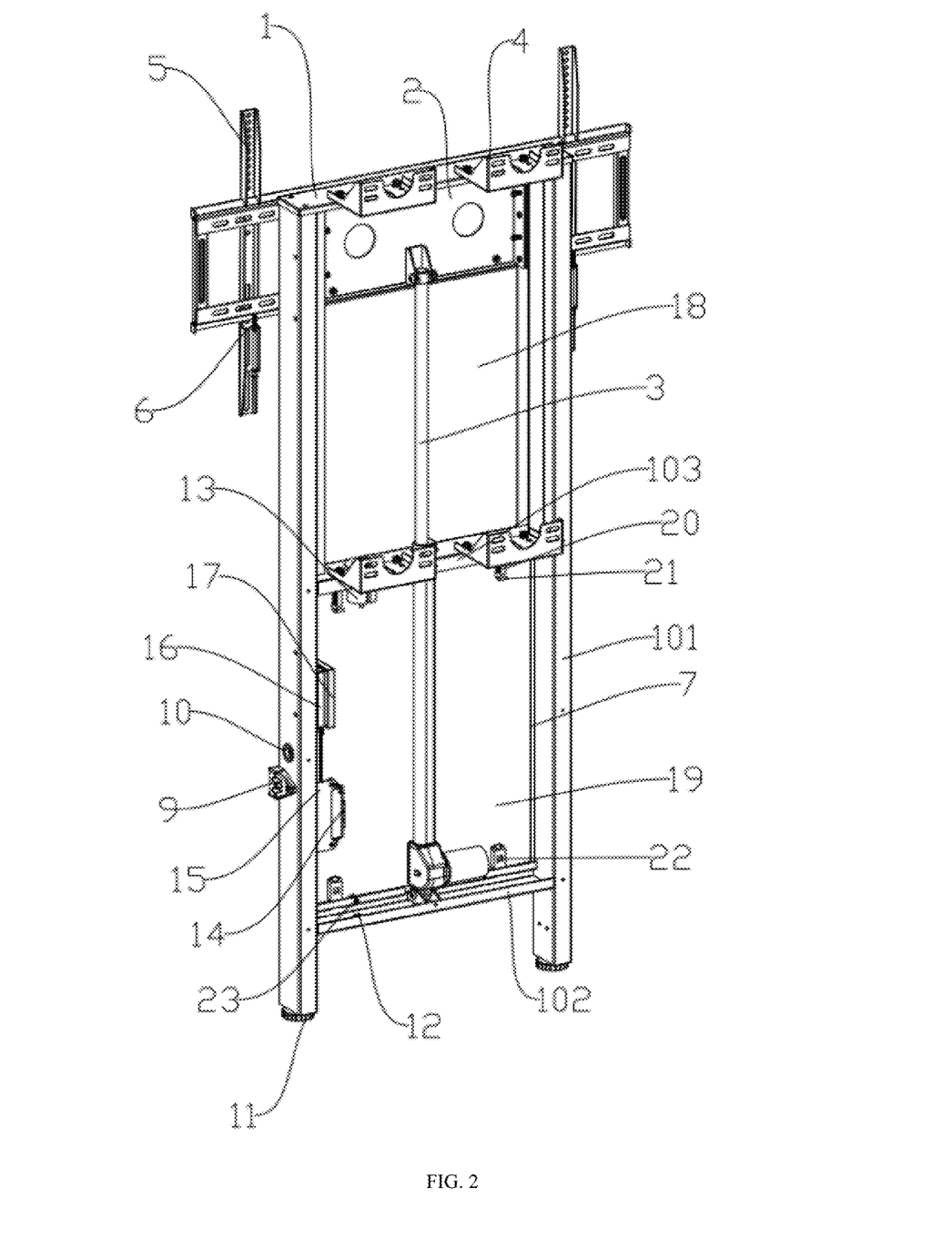
FIG. 2 is a schematic diagram of the back-side structure of the display screen mounting device according to an embodiment of the present invention.

Specifically, as shown in FIG. 2, a wired hand controller 9 is provided on one of the vertical rods 101, and the wired hand controller 9 is fixed to this vertical rod 101 by a round-headed cross screw bolt of M4 mm*8 mm, and the wired hand controller 9 controls the electric push rod 3 to drive the lifting of the display screen.

Specifically, as shown in FIG. 2, a through hole is provided in the vertical rod 101, and a protective coil 10 is provided at each of two ends of the through hole. The protective coil 10 is provided to protect the cable passing through the through hole, so as to prevent the cable from being worn and damaged, and avoid causing danger.

Specifically, as shown in FIG. 1, an adjustable foot 11 is provided at the bottom of each of the vertical rods 101, and the heights of the two vertical rods 101 can be adjusted by the adjustable foot 11, so that the heights of the two vertical rods 101 are kept uniform, and the stability of the stand 1 is ensured.

Specifically, as shown in FIG. 2, the bottom rod 102 is further provided with a wire pressing plate 12, and the wire pressing plate 12 is fixed to the bottom rod 102 by a round-headed cross screw bolt of M4 mm*8 mm. By providing the wire pressing plate 12, the passing wires are arranged and fixed in place so as to prevent any danger caused by the wires being easily damaged, which may lead to electricity leakage, due to friction during the course of wire winding.

In one embodiment, as shown in FIG. 1, the display screen mounting device further comprises a fixing seat 4 that is detachably connected with the stand 1 and is configured to be connected to a wall, the fixing seat 4 has a first service state and a second service state, a distance between the stand 1 and the wall is different in the first service state and in the second service state. The distance between the stand 1 and the wall can be adjusted by switching between the different service states of the fixing seat 4, thereby enhancing the installation flexibility of the display screen mounting device and meeting the requirements of the wall in different application scenarios.

In one embodiment, as shown in FIG. 1, the fixing seat 4 comprises a first fixing plate 401 and a second fixing plate 402, the first fixing plate 401 is connected with the second fixing plate 402 at a predetermined angle, a length of the first fixing plate 401 is greater than that of the second fixing plate 402, in the first service state, the first fixing plate 401 is connected with the stand 1 and the second fixing plate 402 is connected with the wall, and in the second service state, the second fixing plate 402 is connected with the stand 1 and the first fixing plate 401 is connected with the wall.

Figure 4:
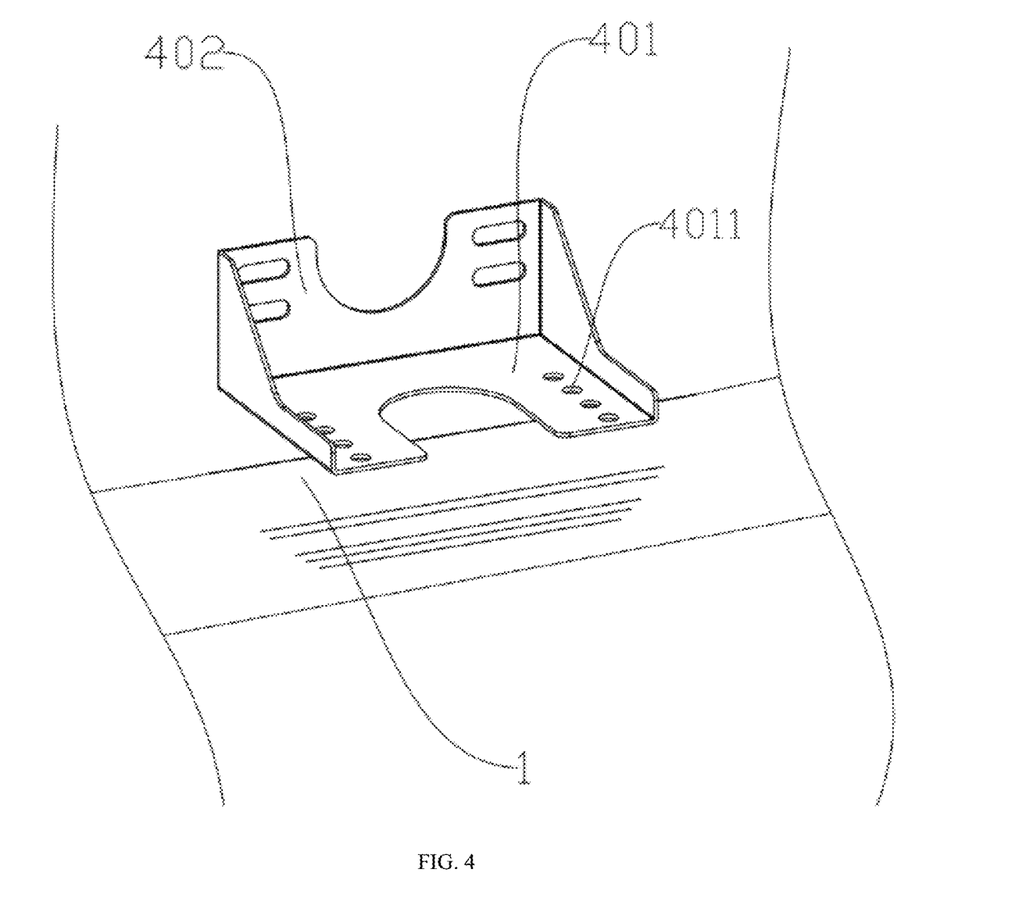
FIG. 4 is a structural schematic diagram of the fixing seat of the display screen mounting device according to an embodiment of the present invention in a first service state.
Figure 5:
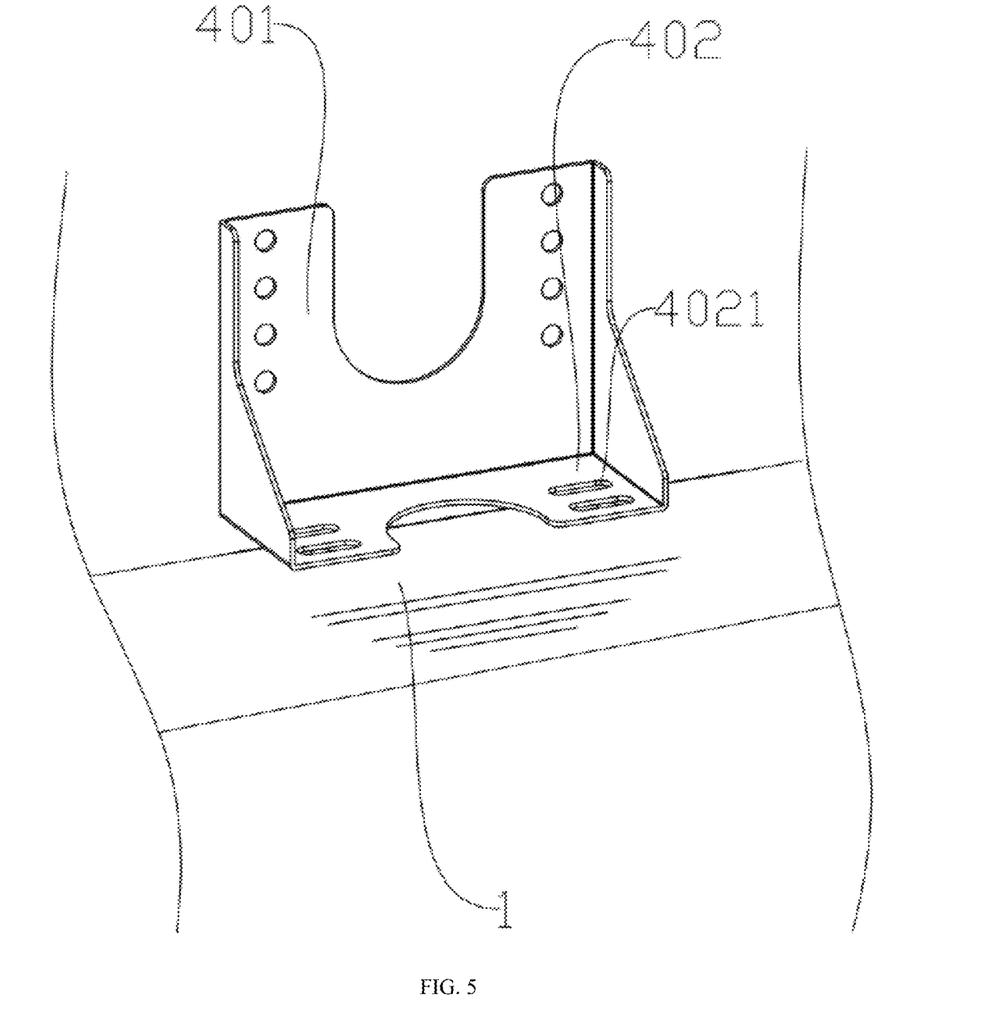
FIG. 5 is a structural schematic diagram of the fixing seat of the display screen mounting device according to an embodiment of the present invention in a second service state.

Specifically, as shown in FIG. 4, in the first service state, the first fixing plate 401 is connected with the stand 1 and the second fixing plate 402 is connected with the wall, and at this time, the distance between the stand 1 and the wall is relatively large; As shown in FIG. 5, in the second service state, the second fixing plate 402 is connected with the stand 1, and the first fixing plate 401 is connected with the wall, and at this time, the distance between the stand 1 and the wall is relatively small.

It is worth noting that, as shown in FIGS. 4 and 5, a plurality of first holes 4011 are provided on the first fixing plate 401, and the plurality of first holes 4011 are spaced apart one by one along an edge part of the first fixing plate 401 towards the connection position between the first fixing plate 401 and the second fixing plate 402. The second fixing plate 402 is provided with a plurality of second holes 4021, and the plurality of second holes 4021 are spaced apart one by one along an edge part of the second fixing plate 402 towards the connection position between the first fixing plate 401 and the second fixing plate 402. When the fixing seat 4 is in the first service state, the distance from the stand 1 to the wall is 40 mm-100 mm depending on the connection position between the stand 1 and a selected one of the first holes 4011, and when the fixing seat 4 is in the second service state, the distance from the stand 1 to the wall is 20 mm-40 mm depending on the connection position between the stand 1 and a selected one of the second holes 4021.

Specifically, the fixing seat 4 is connected and fixed to the stand 1 by a cross groove outer-hexagonal screw bolt of M8 mm*20 mm.

Figure 3:
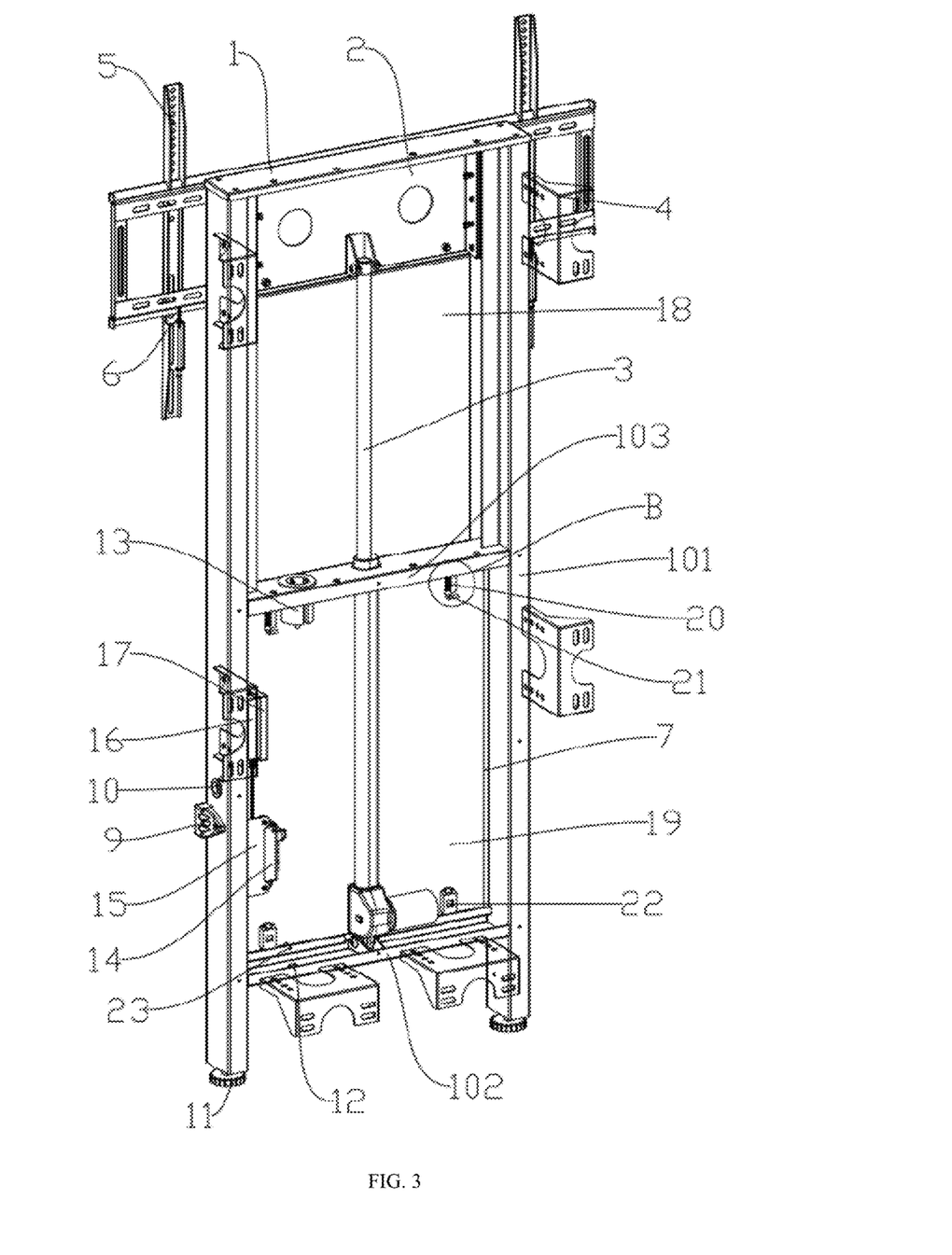
FIG. 3 is a structural schematic diagram of the display screen mounting device according to an embodiment of the present invention at different mounting positions of a fixing seat.

It should be further explained that, as shown in FIG. 3, the connection position between the fixing seat 4 and the stand 1 can be arbitrarily adjusted according to the actual situation, which improves the flexibility of installation of the stand 1 and improves the applicability for different scenarios.

In one embodiment, as shown in FIG. 2, the display screen mounting device further comprises a hanging bar 5 and a locking member 6, wherein the hanging bar 5 is configured to be connected with the display screen, and the hanging bar 5 is provided with a clamping slot, the clamping slot is correspondingly snap-fitted with the connection component 2, and the locking member 6 is configured to be simultaneously inserted into the hanging bar 5 and the connection component 2 so as to connect and fasten the hanging bar 5 and the connection component 2 together. The stability of the connection between the hanging bar 5 and the connection component 2 is enhanced by setting the clamping slot to be snap-fitted with the connection component and by fastening the hanging bar and the connection component together using the locking member 6.

It is worth noting that the hanging bar 5 and the display screen are connected and fastened together first, and then the display screen and the hanging bar 5 together are connected to the connection component 2, so the installation of the hanging bar 5 is a difficult step. In this embodiment, the step of fastening the hanging bar 5 to the connection component 2 can be realized by using the locking member 6, so that quick installation can be achieved.

Specifically, the locking member 6 is a cross-recessed panhead screw bolt of M6 mm*130 mm (with a thread length of 40 mm), and the screw bolt passes through the hanging bar 5 and the connection component 2 from bottom to top, and can be quickly installed via the gap between the wall and the assembly of the hanging bar 5 and the display screen.

In one embodiment, as shown in FIG. 1, the stand 1 further comprises a support rod 103, two ends of the support rod 103 are respectively connected with the two vertical rods 101 to divide the area between the two vertical rods 101 to form a lifting area 18 and an maintenance area 19, and the display screen mounting device further comprises a protective cover 7, wherein the protective cover 7 is detachably connected with the stand 1 and covers the maintenance area 19. The maintenance and replacement of electronic components in the maintenance area 19 are facilitated by setting the protective cover 7 to be detachably connected to the support rod 103.

It is worth noting that the display screen only moves up and down within the lifting area 18, that is, the length of the slider is equal to the distance from the top end of the vertical rod 101 to the support rod 103, and both of the sliding blocks touch the support rod 103 when they have moved to the lowest point. At the same time, the position of the display screen does not adversely affect the assembling and disassembling of the protective cover 7.

Specifically, as shown in FIG. 2, a circular socket 13 is provided on the support rod 103, and the circular socket 13 is connectable to a power supply.

Specifically, as shown in FIG. 2, a control box 14 and an adapter 16 are provided in the maintenance area 19, and the control box 14 is fixed to a control box connector 15 by a round-headed cross screw bolt of M5 mm*8 mm, and the adapter 16 is fixed to an adapter connector 17.

Specifically, both the control box connector 15 and the adapter connector 17 are connected and fixed to one of the vertical rods 101 by a round-headed cross screw bolt of M4 mm*8 mm.

Figure 9:
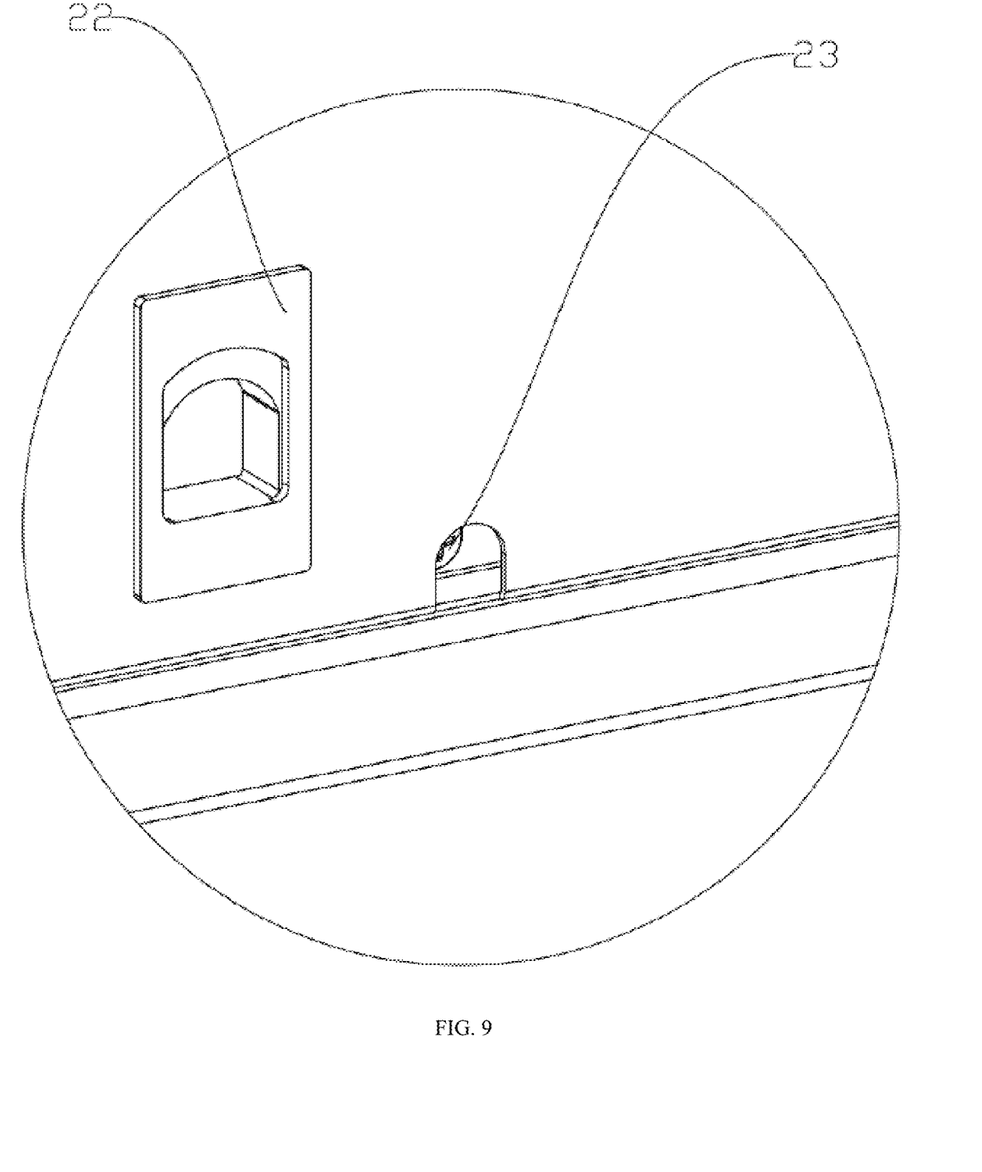
FIG. 9 is a partially enlarged schematic view of part A in FIG. 1.
Figure 10:
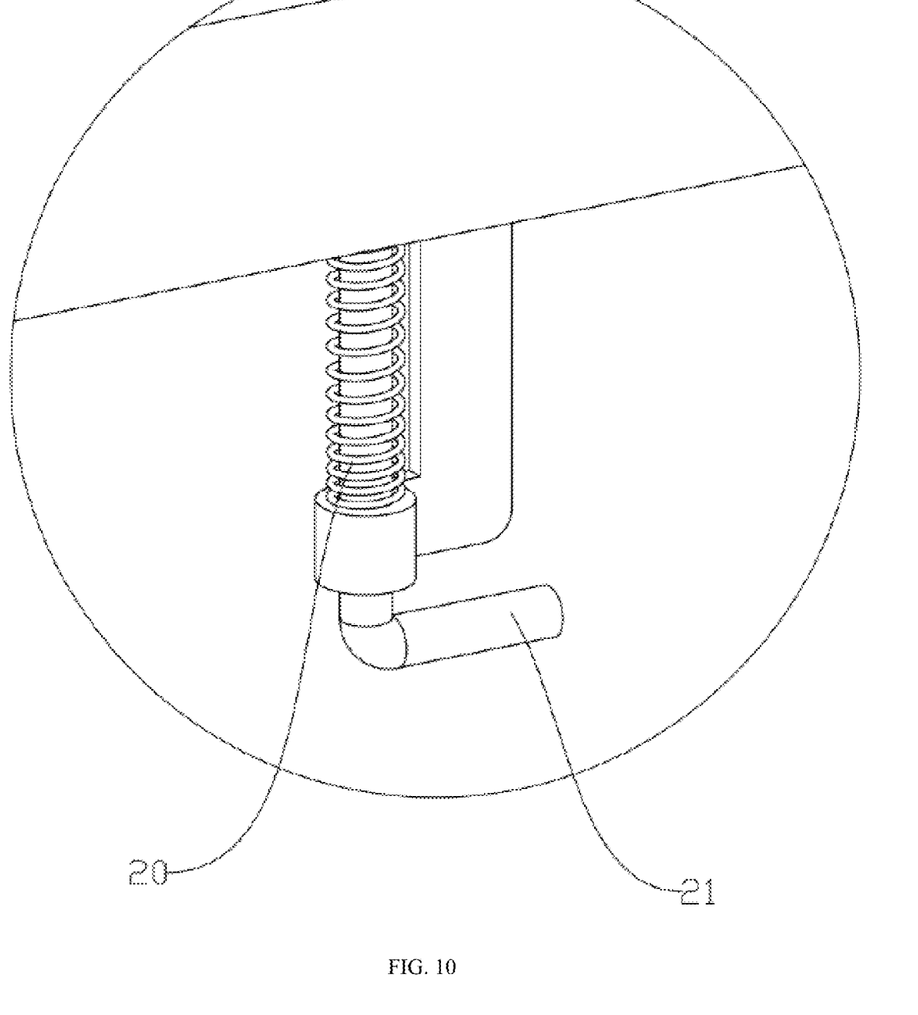
FIG. 10 is a partially enlarged schematic view of part B in FIG. 3.

In one embodiment, as shown in FIGS. 9 and 10, a buckle 22 and a reinforcement member 23 are arranged on a lower side of the protective cover 7, the buckle 22 is snap-fitted with the bottom rod 102, a bottom part of the protective cover 7 is provided with a slot, the reinforcement member 23 is configured to be completely inserted into the slot so as to connect and fasten the protective cover 7 and bottom rod 102 together, an upper side of the protective cover 7 is further provided with a spring 20 and a slidable pin 21, the spring 20 is sleeved on the slidable pin 21, and the slidable pin 21 is simultaneously inserted into the protective cover 7 and the support rod 103 so as to connect and fasten the protective cover 7 and the support rod 103 together. By arranging a buckle 22 and a reinforcement member 23 at a bottom part of the protective cover 7, the connection between the protective cover 7 and the bottom rod 102 is firmer, and by arranging a spring 20 and a slidable pin 21 at a top part of the protective cover 7, the connection between the protective cover 7 and the support rod 103 is firmer, thereby further improving the protective performance of the protective cover 7 for electronic components in the maintenance area 19.

Specifically, the reinforcement member 23 is a round-headed cross screw bolt of M4 mm*15 mm, and the protective cover 7 is further fixed by the cross screw bolt, thereby ensuring safety in use.

Figure 8:
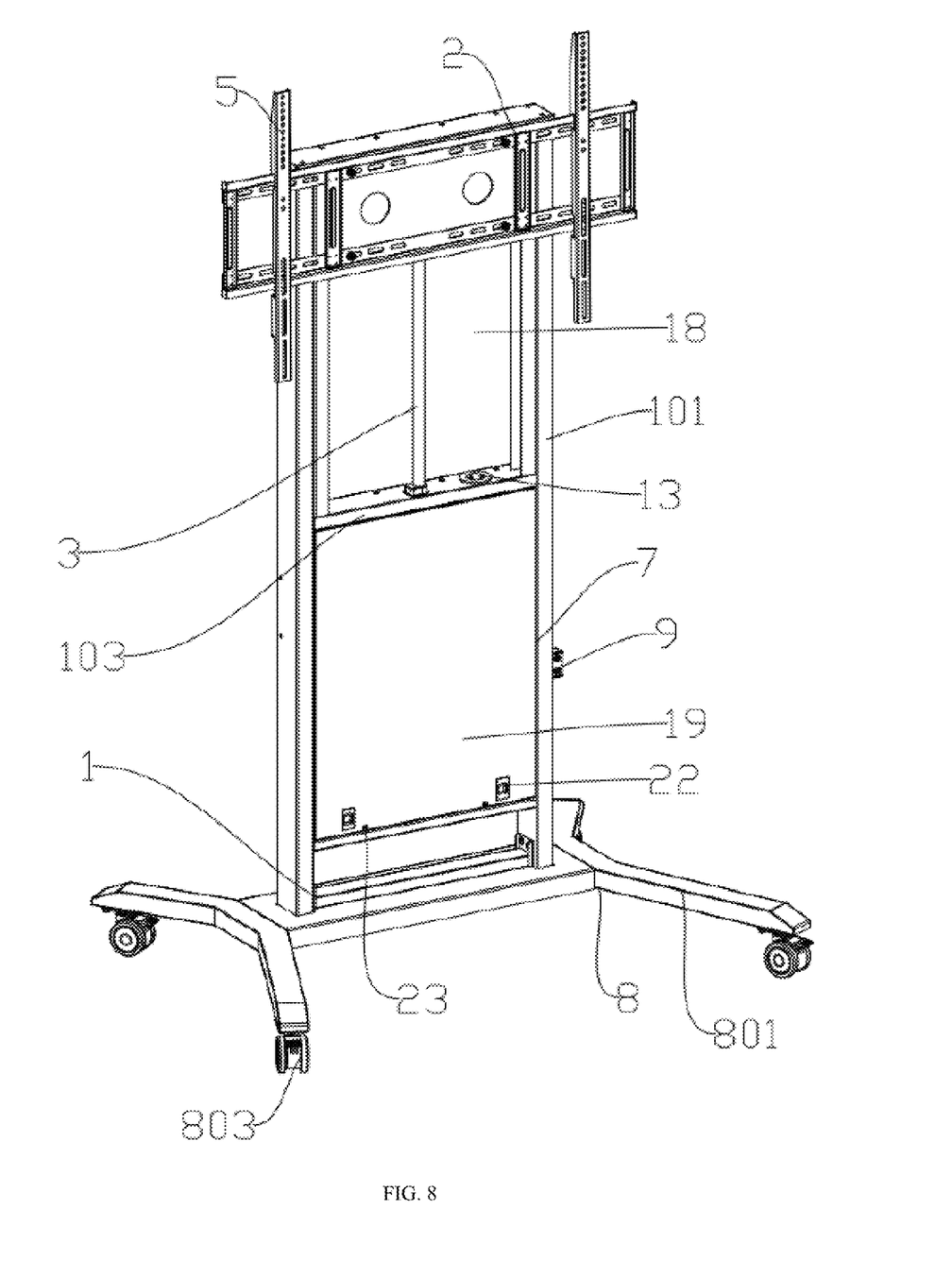
FIG. 8 is a structural schematic diagram of the base component connected to the stand of the display screen mounting device according to an embodiment of the present invention.

In an embodiment, as shown in FIG. 8, the display screen mounting device further comprises a base component 8, the base component 8 is detachably connected to a bottom part of the stand 1.

Figure 6:
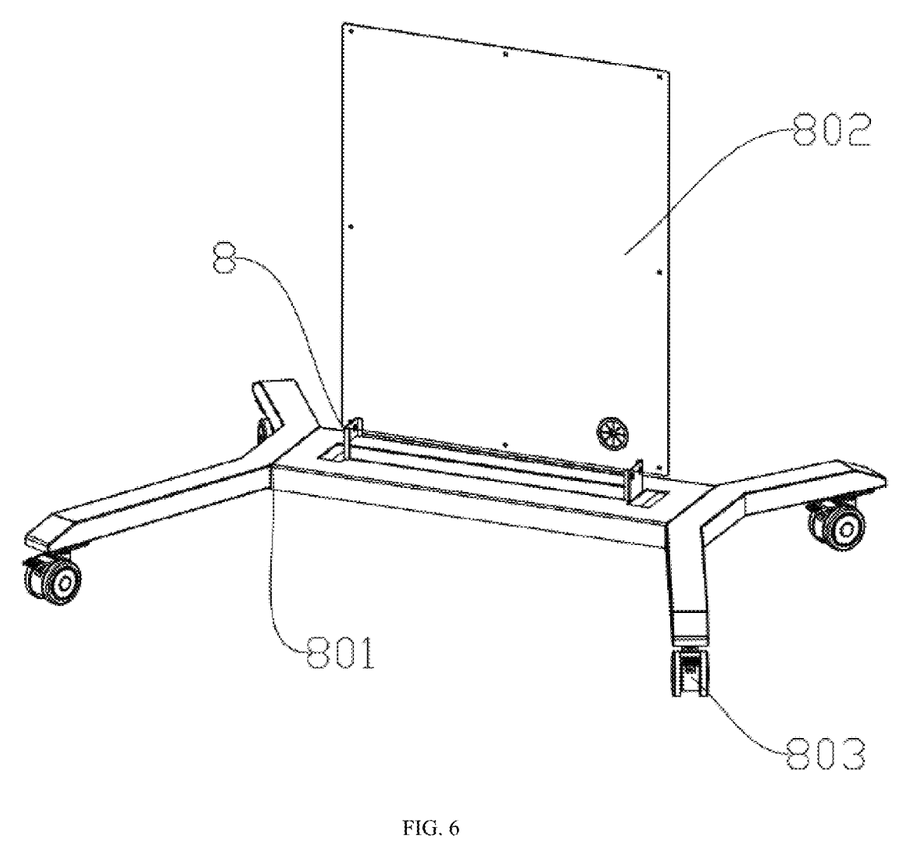
FIG. 6 is a structural schematic diagram of a base component of the display screen mounting device according to an embodiment of the present invention.
Figure 7:
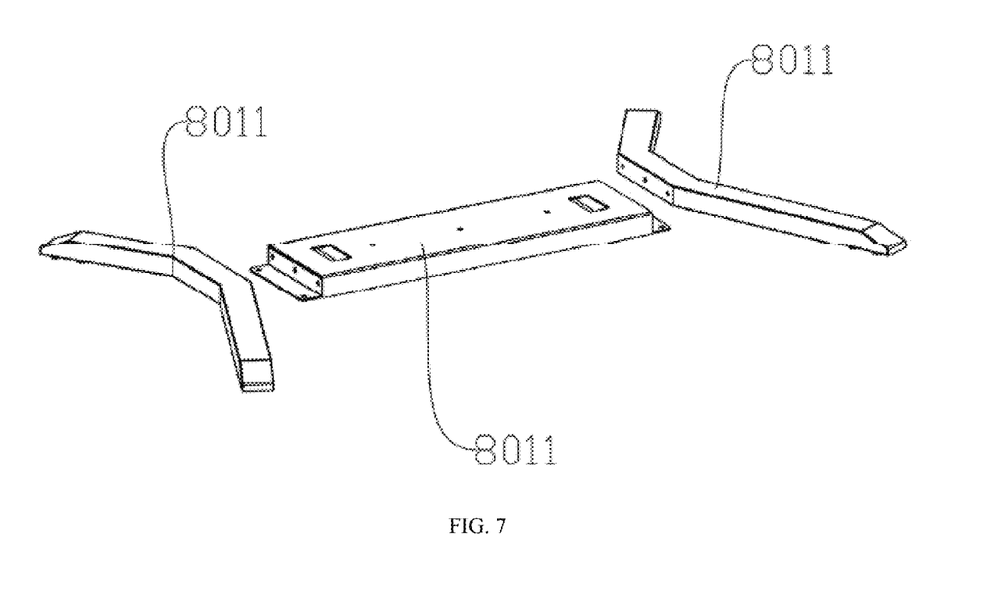
FIG. 7 is a structural schematic diagram of an exploded view of the base body of the display screen mounting device according to an embodiment of the present invention.

In an embodiment, as shown in FIGS. 6 and 7, the base component 8 comprises a base body 801 and a baffle plate 802, wherein the base body 801 is connected to the baffle plate 802, the baffle plate 802 covers the maintenance area 19 and is spaced apart from the protective cover 7. By setting the baffle plate 802, undesired damage caused by exposure of cables and power supply accessories on the back side is prevented, and personal safety is guaranteed for users.

In an embodiment, as shown in FIG. 7, the base body 801 comprises a plurality of base pieces 8011, wherein the plurality of base pieces 8011 can be joined together. By splitting the base body into a plurality of pieces, the base can be quickly disassembled and assembled, the storage space is reduced, the packaging material and the costs are saved.

In an embodiment, as shown in FIG. 6, the base component 8 further comprises a plurality of rollers 803, wherein, the plurality of the rollers 803 are arranged to correspond to the base body 801. By arranging a plurality of rollers 803, the mobility of the display screen mounting device is improved.

When using the display screen mounting device of the present embodiment, one of the service states of the fixing seat 4 is selected firstly according to the wall condition, and the stand 1 is connected and fastened to the wall by using the fixing seat 4 in the selected service state; Then, the display screen is connected to the hanging bar 5; Next, the hanging bar 5 is snap-fitted with the connection component 2 and the locking member 6 is fixed therein; Finally, the wired manual controller 9 is utilized to control the electric push rod 3 to move up and down so as to drive the display screen to move up and down as needed. In addition, when the position of the display screen mounting device needs to be moved, the base component 8 can be assembled and the stand 1 can be connected to the base body 801 thereof, and the movement of the position of the display screen mounting device can be carried out by using the rollers 803 on the base body 801.

Although embodiments of the present invention are described with reference to the accompanying drawings, a person skilled in the art can make various modifications and variations without departing from the spirit and scope of the present invention, such modifications and variations falling within the scope defined by the appended claims.

The invention claimed is:

1. A display screen mounting device, comprising:
    a stand (1);
    a connection component (2), wherein the connection component (2) is slidably connected to the stand (1), the connection component (2) and the stand (1) have two slidable connection positions which are spaced apart from each other, and the connection component (2) is configured to be connected to a display screen;
    an electric push rod (3), wherein a fixed end of the electric push rod (3) is connected to the stand (1), a driving end of the electric push rod (3) is connected to the connection component (2), a connection position of the driving end of the electric push rod (3) in connection with the connection component (2) is located between the two slidable connection positions, and the electric push rod (3) is configured to drive the connection component (2) to move up and down along the stand (1).

2. The display screen mounting device according to claim 1, wherein, the display screen mounting device further comprises a hanging bar (5) and a locking member (6), the hanging bar (5) is configured to be connected with the display screen, the hanging bar (5) is provided with a clamping slot, the clamping slot is correspondingly snap-fitted with the connection component (2), and the locking member (6) is configured to be simultaneously inserted into the hanging bar (5) and the connection component (2) so as to connect and fasten the hanging bar (5) and the connection component (2) together.

3. The display screen mounting device according to claim 1, wherein, the display screen mounting device further comprises a fixing seat (4), the fixing seat (4) is detachably connected with the stand (1) and is configured to be connected to a wall, the fixing seat (4) has a first service state and a second service state, a distance between the stand (1) and the wall is different in the first service state and in the second service state.

4. The display screen mounting device according to claim 3, wherein, the fixing seat (4) comprises a first fixing plate (401) and a second fixing plate (402), the first fixing plate (401) is connected with the second fixing plate (402) at a predetermined angle, a length of the first fixing plate (401) is greater than that of the second fixing plate (402), in the first service state, the first fixing plate (401) is connected with the stand (1) and the second fixing plate (402) is connected with the wall, and in the second service state, the second fixing plate (402) is connected with the stand (1) and the first fixing plate (401) is connected with the wall.

5. The display screen mounting device according to claim 1, wherein, the stand (1) comprises two vertical rods (101) spaced apart from each other and a bottom rod (102), two ends of the bottom rod (102) are respectively connected to bottom parts of the two vertical rods (101), the connection component (2) is slidably connected to the two vertical rods (101) at the same time to form the two slidable connection positions, and the fixed end of the electric push rod (3) is connected to the bottom rod (102).

6. The display screen mounting device according to claim 5, wherein, the stand (1) further comprises a support rod (103), two ends of the support rod (103) are respectively connected with the two vertical rods (101) to divide the area between the two vertical rods (101) to form a lifting area (18) and an maintenance area (19), and the display screen mounting device further comprises a protective cover (7), the protective cover (7) is detachably connected with the stand (1), and the protective cover (7) covers the maintenance area (19).

7. The display screen mounting device according to claim 6, wherein, a buckle (22) and a reinforcement member (23) are arranged on a lower side of the protective cover (7), the buckle (22) is snap-fitted with the bottom rod (102), a bottom part of the protective cover (7) is provided with a slot, the reinforcement member (23) is configured to be completely inserted into the slot so as to connect and fasten the protective cover (7) and the bottom rod (102) together, an upper side of the protective cover (7) is further provided with a spring (20) and a slidable pin (21), the spring (20) is sleeved on the slidable pin (21), the slidable pin (21) is simultaneously inserted into a top part of the protective cover (7) and the support rod (103) so as to connect and fasten the protective cover (7) and the support rod (103) together.

8. The display screen mounting device according to claim 6, wherein, the display screen mounting device further comprises a base component (8), the base component (8) is detachably connected to a bottom part of the stand (1).

9. The display screen mounting device according to claim 8, wherein, the base component (8) comprises a base body (801) and a baffle plate (802), the base body (801) is connected to the baffle plate (802), the baffle plate (802) covers the maintenance area (19) and is spaced apart from the protective cover (7).

10. The display screen mounting device according to claim 9, wherein, the base body (801) comprises a plurality of base pieces (8011), and the plurality of base pieces (8011) can be joined together; and/or, the base component (8) further comprises a plurality of rollers (803), wherein the plurality of the rollers (803) are arranged to correspond to the base body (801).

\* \* \* \* \*